Figure 2:
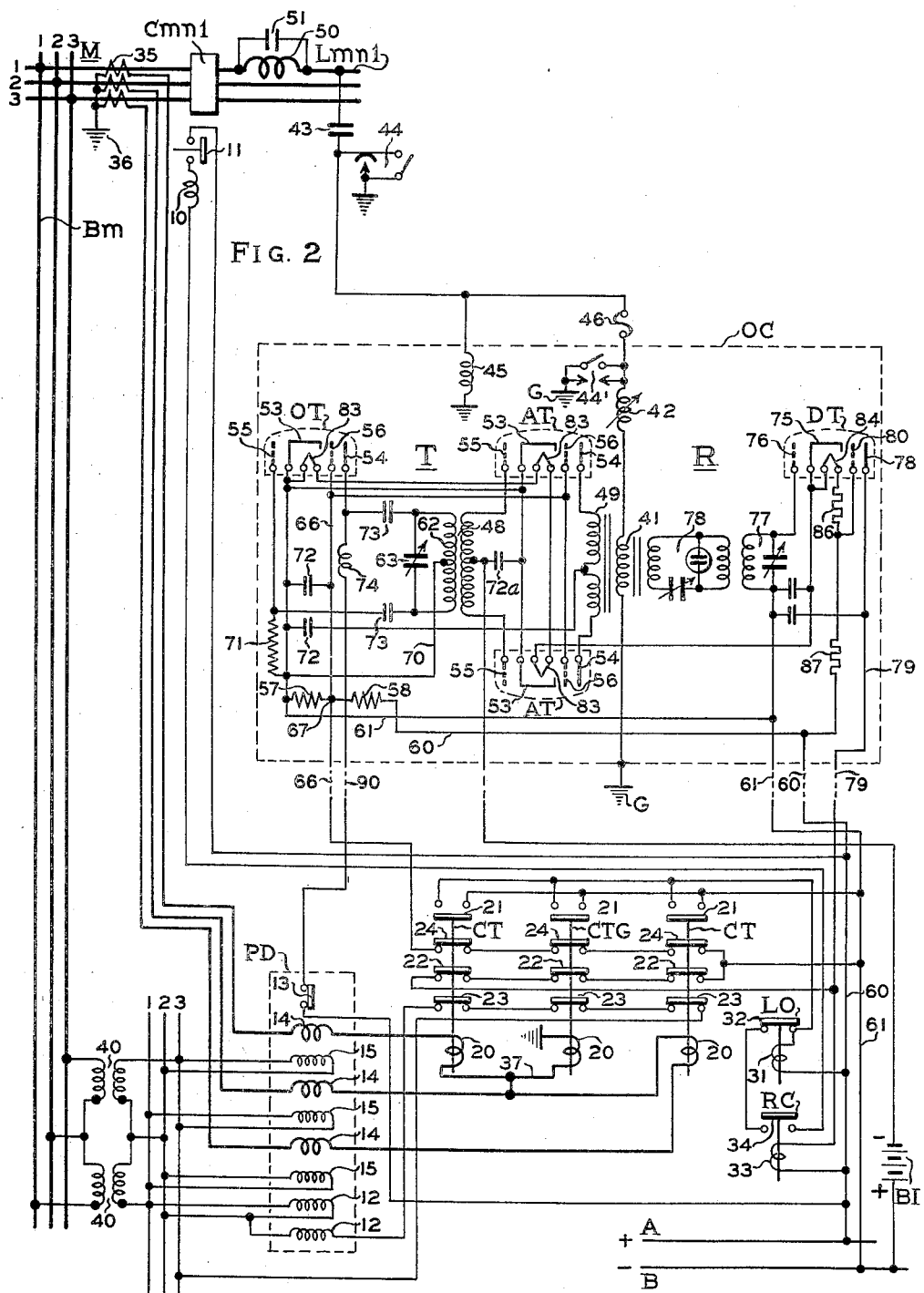

July 13, 1937.　　　　P. SPORN ET AL　　　　2,087,127
PROTECTIVE SYSTEM FOR ELECTRIC POWER TRANSMISSION LINES
Filed Nov. 29, 1935　　　6 Sheets-Sheet 1
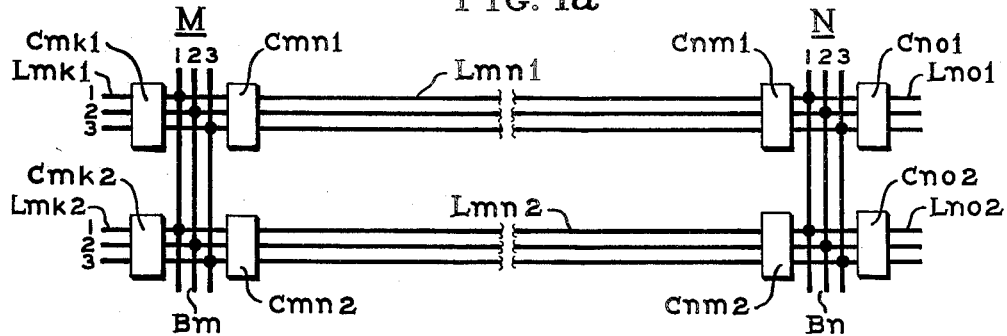
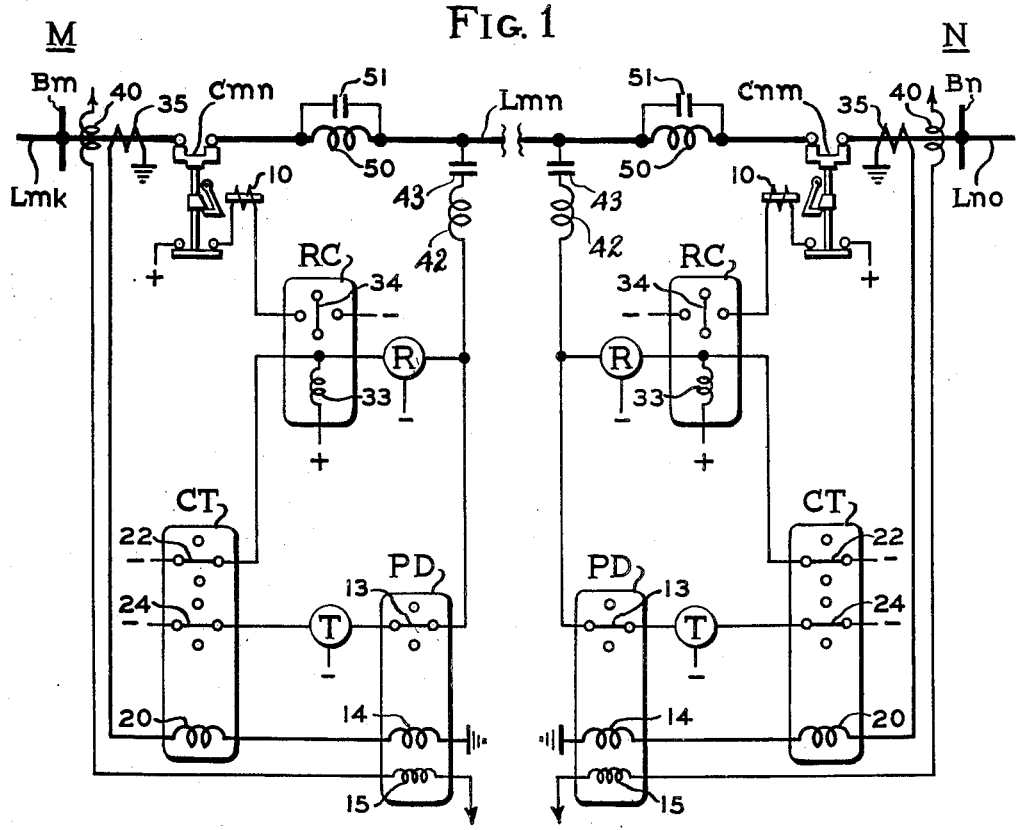

July 13, 1937.　　P. SPORN ET AL　　2,087,127
PROTECTIVE SYSTEM FOR ELECTRIC POWER TRANSMISSION LINES
Filed Nov. 29, 1935　　6 Sheets-Sheet 2

INVENTORS
Philip Sporn & Charles Albert Muller
BY S M Pineles
ATTORNEY

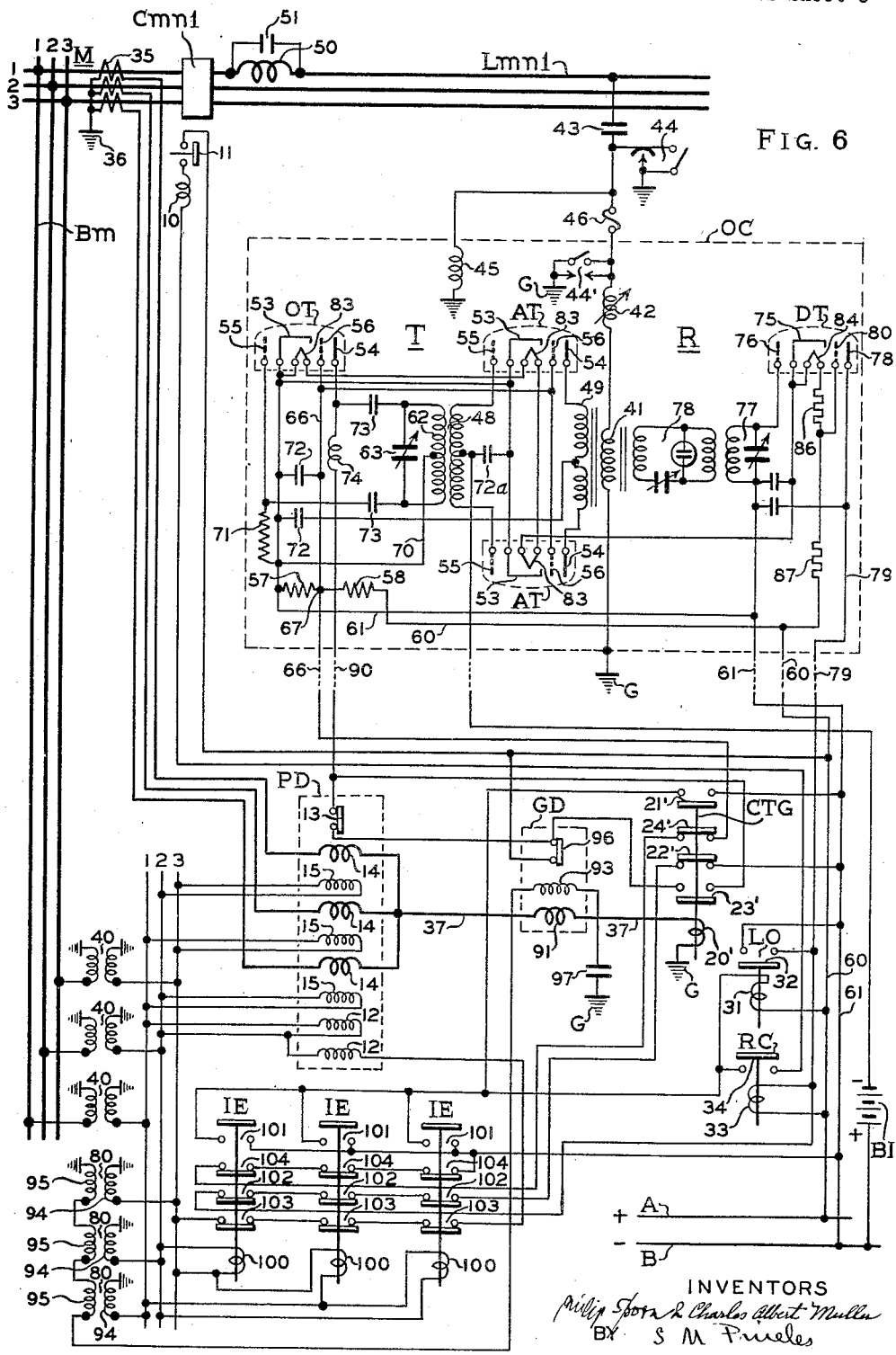

Patented July 13, 1937

2,087,127

UNITED STATES PATENT OFFICE 2,087,127

PROTECTIVE SYSTEM FOR ELECTRIC POWER TRANSMISSION LINES

Philip Sporn, Brooklyn, and Charles Albert Muller, Tuckahoe, N. Y.

Application November 29, 1935, Serial No. 52,012

30 Claims. (Cl. 175—294)

The present invention relates to protective systems for electric power transmission systems, and this application is a continuation in part of our copending application, Serial No. 1,324 filed January 11, 1935.

It is among the objects of the present invention to provide an extremely fast and positively-acting protective system whereby on occurrence of a fault on an electric power transmission line system producing a dangerous flow of fault current, only the faulty section is cut out of the system with extreme speed leaving the remainder of the system intact and stable.

A distinct object of the invention is to secure an extremely high degree of reliability of the protective equipment by combining devices and relays known for reliable construction and operation into a simple, economical protective system giving rapid protection to the entire distance of any line portion regardless of the type of fault.

In accordance with the invention, extremely fast and positive clearing of a faulty transmission line section without disturbance of the system is secured by effecting the opening of the interrupter at each end of a protected line section with fast acting trip means that are restrained from tripping by a fast acting fault responsive relay which removes the restraining action on the occurrence of a fault and permits the trip means to effect fast opening of the interrupter if the fault is on the protected section, the trip means being subjected to an additional restraint exerted on the occurrence of a fault in accordance with the location of the fault to prevent opening of the interrupter if the fault is outside the protected section.

The foregoing and other objects of the invention will be best understood from the following description of its exemplifications, reference being had to the accompanying drawings, wherein Fig. 1 is a diagram of a protective system illustrating the principles underlying the invention;

Fig. 1a is a diagrammatic view of a part of an electric power transmission system to which the invention is applied; and Figs. 2, 3, 4, 5 and 6 are diagrammatic views of the protective equipment at the individual stations of protected line sections of protective systems illustrating various embodiments of the invention.

In Fig. 1a is shown a part of a typical alternating current transmission line system operating, for instance, at 60 cycles, including line stations M, N, provided with bus bars $Bm$, $Bn$, respectively. A two circuit three-phase high voltage line extends between these stations. Two three-phase line sections $Lmk1$ and $Lmk2$, each comprising three-phase high voltage conductors 1, 2, 3, coming from an adjacent similar station K enter station M, being connected through circuit breakers $Cmk1$ and $Cmk2$ to the bus bars $Bm$ of station M; transmission line sections $Lmn1$ and $Lmn2$ extend between stations M and N and are connected to the bus bars $Bm$, $Bn$ at said stations through circuit breakers $Cmn1$, $Cmn2$, $Cnm1$, $Cnm2$; and two transmission line sections $Lno1$ and $Lno2$ leading to further stations are connected through circuit breakers $Cno1$ and $Cno2$ to the bus bars $Bn$ of station N. The two circuits of the line are thus formed of individual line sections that may be each separately cut out so that in case of failure of one circuit line section, the entire load may be carried on the remaining circuit line section if it is left intact.

In large interconnected electric power systems fed with power at a plurality of spaced points, the requirements for positive continuity of service to all power consuming points makes the maintenance of system stability of paramount importance. The stability of a power line system depends on speedy and positive elimination of short-circuits and similar faults from the system. To this end the system is divided into line sections interconnected by circuit breakers provided at the ends of the sections. To maintain the stability of the system without disturbing the continuity of the service, it is essential that the circuit breakers at the ends of a line section shall stay closed, and keep each line section in operation if the fault lies outside the line section, and to secure speedy tripping of the circuit breakers at both ends of a line section if a fault occurs on the line section. Such protective systems are described in our article in the Electrical World published September 10, 1932 in New York, and disclosed in our copending application, Serial No. 716,798 filed March 22, 1934, which is a continuation in part of our copending application, Serial No. 584,936 filed January 6, 1932, and they are satisfactory if operating in conjunction with circuit breakers which on tripping complete the break of the circuit connection within 6 to 8 cycles.

The increase of the requirements for system stability brought about the construction of circuit breakers having greater opening speed and which are able to completely break the circuit connection in about 3 cycles or less. The present invention provides a protective relay system for operating at a much higher speed than those known heretofore and able to actuate the tripping circuit of the circuit breakers of a faulty section in 1 cycle only or less, so that in combination with the high-speed circuit breakers opening the circuit within about 2 cycles or less, a power line system will be cleared from a faulty section within about 3 to 4 cycles from the occurrence of a fault.

Before proceeding with a detailed description of embodiments of the protective relaying system exemplifying the invention as actually installed on transmission line systems, its principles will be explained by reference to the simplified schematic single phase diagram of such protective system shown in Fig. 1. A transmission line section L$mn$ which is to be protected has its opposite ends connected by circuit interrupters C$mn$ and C$nm$ to bus bars B$m$, B$n$ in stations M, N, respectively, located along an electric power transmission line. Each circuit interrupter is shown arranged to be opened by a tripping coil 10 connected to a tripping circuit which is completed by trip means RC arranged to keep the tripping circuit open under normal operating conditions and to complete the tripping circuit only when the circuit interrupter is to be tripped for disconnecting the line section from the line.

The trip means RC, for which various kinds of devices may be used, is indicated in the form of a simple relay with trip contacts 34 arranged to be actuated either to an open non-tripping condition or to a closed trip condition by controlling the energization of the actuating windings of its coil 33. The trip means relay RC is normally restrained in its non-trip condition by fault responsive means, such as a local energizing circuit which holds the relay contacts 34 open when its actuating coil 33 is energized from a local source, such as a station battery, through contacts 22 of a fault responsive relay CT having an actuating winding 20 which is energized in accordance with the line conditions by its connection to the line current transformer 35.

The fault responsive relay CT operates as a fault detector and, as shown, holds its contacts 22 closed during normal operating condition to prevent opening of the interrupter, but opens instantaneously its contacts 22 and cuts off the local energy supply to trip relay coil 33 on the occurrence of a fault on the line, so as to permit the trip relay contacts 34 to close the trip circuit and effect speedy opening of the interrupter, as required in the event the fault occurs on the protected line section L$mn$. The contacts 22 of the fault responsive relay CT operate thus to control the restraining action of the local actuating circuit in preventing the opening and effecting the opening of the interrupter.

The operation of the trip means relay RC in completing the trip circuit is also subjected to an additional selective trip restraining or blocking action which makes sure that the relay RC does not assume its trip condition, but remains in a non-trip condition in which it prevents the opening of the interrupter in the event the fault that occurred on the line is outside the protected line section L$mn$.

This selective trip restraining or blocking action may be secured by providing at each section end an oscillation transmitter T and an oscillation receiver R arranged to supply to the trip relay RC blocking energy which prevents it from assuming the tripping condition, the operation of the transmitter being started upon the occurrence of a fault and selectively controlled in accordance with the location of the fault within or outside the protected line section.

As shown in Fig. 1, such oscillation transmitter T and receiver R of each station may be suitably coupled through a tuning inductance 42 and a coupling condenser 43 to one of the transmission line conductors L$mn$, and oscillation traps formed of an inductance 50 and a condenser 51 provided at each section end confine the transmitted oscillations within the protected line section. As described in connection with Figs. 2 to 6, such transmitter T may have an oscillation valve which is normally prevented from oscillating by applying a suitable bias potential to a control electrode of the valve through fault responsive means such as the normally closed contacts 24 of the fault detector relay CT arranged to open and start oscillations upon the occurrence of a fault. In addition, the operation of the oscillation transmitter T is subjected to the selective control action of a directional relay PD provided with current windings 14 and voltage windings 15 which are energized by the current transformer 35 and a voltage transformer 40 in accordance with the direction of the energy flow in the line to prevent transmission of oscillations if the fault is within the line section irrespective of the oscillation control action of the fault responsive relay CT at its bias-applying contacts 24. To obtain maximum speed in clearing a faulty line, the directional relay is shown provided with normally closed contacts 13 arranged to open and instantaneously stop transmission on the occurrence of a fault if, and only if, the energy flows into the line section, but to remain closed and permit transmission of carrier oscillations if the line energy flows out from the protected section.

With such protective system, the completion of the tripping circuit for effecting a circuit opening operation is determined by single relay means, namely, the trip means RC that are subjected to the restraining action of a local circuit through a set of contacts of an instantaneously-acting fault detecting relay CT which removes the restraining action on the occurrence of a fault to bring about fast tripping by the trip relay means RC if the fault occurs on the protected section. The completion of the tripping operation by the trip relay means RC is, however, subjected to independent restraining action of the oscillation channel which is selectively actuated on the occurrence of a fault in accordance with the direction of the energy flow in the line to permit transmission of carrier energy to the trip relay and prevent tripping if the fault is outside the protected line section, but prevent transmission and assure fast interrupter opening if the fault is within the protected line section.

The operation of such system is as follows:

Under normal power flow conditions, the fault responsive relay CT at each section end will have its contacts 22 and 24 closed, thus completing the local trip restraining circuit to the trip relay means RC, preventing the opening of the interrupter at each section end, and completing the transmission restraining bias circuit to the transmitter, preventing transmission of oscillations from each transmitter.

In the event of an external fault on the line, for instance, to the right of station N, abnormal fault energy will flow at station M from the bus bar B$m$ into the line section and at station N from the line section into the bus bar B$n$. As a result the fault detector relay CT at each station end will instantaneously actuate its contacts 22 to cut off the local trip restraining action exerted on the trip means RC so as to permit tripping at each station, while at the same time the instantaneously actuated fault detector contacts 24 remove the transmission restraining bias from the local transmitter T to start the transmission of oscillations from each station for restoring the trip restraint.

At station M the abnormal energy inflow from the bus $Bm$ into the line section $Lmn$ effects instantaneous actuation of the directional relay PD to prevent by its contacts 13 the local transmitter T from transmitting oscillations notwithstanding the removal of the transmission preventing bias by the local fault detector relay contacts 24. However, at station N the energy outflow from the line section $Lmn$ out into the bus $Bn$ actuates the directional relay PD to leave its contacts 13 in the normal position to permit the transmitter T, which has been started by the bias removing fault detector contacts 24, to transmit energy to the receivers R at stations M as well as N and cause the receivers R at both stations M and N to hold the local trip relay means RC in the open non-trip condition and prevent opening of the interrupters $Cmn$ and $Cnm$ at both station ends of the section. The protected line section $Lmn$ remains thus connected in the line notwithstanding the flow of fault energy to an external fault.

If, however, an internal fault occurs on the line section $Lmn$, abnormal fault energy will flow into the line section from both ends of the section. As a result, the fault detector relay CT at each section end will, as before, instantaneously actuate its contacts 22 to cut off the local trip restraining action on the trip means RC so as to permit quick interrupter tripping at each section end, while at the same time the instantaneously actuated fault detector contacts 24 remove the transmission restraining bias from the local transmitter T to start transmission of oscillations from each station for restoring the trip restraint. However, since the abnormal fault energy is now flowing into both ends of the line section to the point of the internal fault, the directional relays PD at both stations will be instantaneously actuated to stop the transmissions from the transmitters T at both stations M, N, thus rendering ineffective the trip restraining action of the transmitters T and permitting the trip means RC at both section ends to complete quickly the tripping of the associated interrupters. The faulty section is thus quickly disconnected from the transmission line.

The relay arrangement described above will also secure the same fast selective protection for line sections which are fed only from one end, and it may employ other signal transmitting means for selectively controlling the operation of the interrupter means.

Similarly, various kinds of devices and relays may be combined into a protective system operating in accordance with the principles of the invention. One of the great advantages of the protective system of the invention resides in the fact that it lends itself for the protection of standard power transmission lines under the utilization of relays and devices long known for great reliability in construction and performance. To illustrate such practical application of the invention, there are described below several types of protective systems exemplifying our invention, by giving in connection with each exemplification a detailed description of the protective equipment of a transmission line system indicated by Fig. 1a as applied to the connection of the end of a line section $Lmn1$ to the bus bars $Bm$ at station M by circuit breaker $Cmn1$. The line section $Lmn1$ is a part of a single circuit line including the line sections $Lmk1$ and $Lno1$. The protective equipment for each line connection at these stations is exactly like that used in connection with the circuit breaker $Cmn1$ as described below.

In the first type of protective system of our invention shown in Fig. 2, the high-voltage circuit breaker $Cmn1$ connecting the three line conductors 1, 2 and 3 of section $Lmn1$ to the busses $Bm$ consists of three separate oil circuit breaker units arranged to be actuated in common. The circuit breaker is of a type which opens a short-circuit on the line in a very short time, in about 3 cycles or less, such circuit breakers having been found to give reliable operation under severe conditions. The circuit breaker has a tripping coil 10 which trips the breaker when energized by current from a suitable source, such as the station control battery indicated by bus bars A and B. A tripping coil 10 is connected in series with an auxiliary switch 11 and its circuit is opened with the circuit breaker to de-energize the tripping coil when the circuit breaker is open.

The relay system for each station is preferably mounted on a switchboard panel inside the station building. It comprises an instantaneous line-energized power-directional relay PD with two voltage restraint coils 12 arranged to be actuated to close its contacts 13 upon flow of power in the direction from the line section $Lmn1$ into the bus bars $Bm$, and to open its contacts 13 in case the power flows in the opposite direction from the bus bars $Bm$ through the circuit breaker $Cmn1$ into the line section $Lmn1$. The power-directional relay PD has three current coils 14 and three voltage coils 15, the three sets of voltage and current coils acting inductively on suitably mounted discs to turn them in one or the opposite direction, depending on the direction of power flow corresponding to the currents and voltages applied to the actuating coils 14 and 15. The voltage restraint coils 12 are energized from phase to phase voltages in such a manner as to hold contacts 13 closed, regardless of the direction of power flow in the line section, provided the magnitude of the current has not exceeded a predetermined value. The type IDP polyphase induction power-directional relay of the General Electric Company with voltage restraint is suitable for this service. This relay is highly sensitive and operates at less than 1.0 ampere with only 10% of normal voltage and at less than 5.0 amperes with only 3% of normal voltage applied to the potential coil when voltage restraint is removed. It operates at high speed requiring less than ½ cycle to open its contacts and approximately 1 cycle to close its contacts.

The power-directional relay PD is directly actuated by the alternating current flowing in the line making its operation fast, positive and reliable.

In the system of protection shown in Fig. 2, the power-directional relay PD has only one function, namely to apply plate voltage to the transmitter T when its contacts 13 are closed and to remove plate voltage from the transmitter T when its contacts 13 are open.

There are also provided two line-energized instantaneous phase fault relays CT and one similar ground fault relay CTG, each having an actuating current coil 20 arranged to close its contact 21 and to open its contacts 22, 23 and 24 upon flow of a predetermined current. These over-current relays may be of the plunger type. They are very reliable, easy to maintain and simple. They are fast in operation taking less than ½ cycle to open its contacts and approximately 1 cycle to close its contacts. Their current setting is easily adjustable for any pickup value and have a 3 to 1 range of adjustment, that is, the maximum current setting obtainable is equal to three times the minimum current setting obtainable. Type PQ relays of the General Electric Company and type SC relays of the Westinghouse Company are suitable for this purpose.

The current tripping relays CT and CTG are directly actuated by the alternating current flowing in the line making their operation fast, positive and reliable.

There is also provided a lock-out relay LO having an actuating coil 31 arranged to open its contacts 32 after a predetermined time delay when its coil 31 is energized to close its contacts quickly when the coil 31 is de-energized. Type PQ time-delay relays of the General Electric Company are suitable for this purpose.

There is further provided an instantaneous-acting receiver tripping relay RC having an actuating coil 33 arranged to open quickly its contacts 34 when its coil 33 is energized, and to close quickly its contacts when the coil 33 is de-energized. The receiver relay RC may be of the electromagnetic hinged-armature type similar to those employed in the telephone art. These relays are very reliable, easy to maintain and simple. They are fast in operation taking less than ½ cycle to open the contacts and less than 1 cycle to close the contacts.

To energize the current coils of the power-directional relay PD and the current relays CT, CTG, there is provided a set of three current transformers 35 having the secondary windings connected in star, with the starpoint grounded at 36. The three current coils 14 of the power-directional relay PD are connected in the three phase leads of the secondary windings of current transformer 35, while the coils 20 of two current relays CT are connected in two phase leads from the current transformer 35. The coil 20 of the ground relay CTG is connected in the neutral grounded return lead 37 of the current transformers.

The voltage coils 15 of the power-directional relay PD are energized by two open delta-connected potential transformers 40 having their primary windings connected to the bus bars Bm at the station. The phase sequence of the connections of the voltage coils 15 of the power-directional relay PD is arranged to secure the proper directional action of the relays in response to the direction of the proper flow.

An essential part of the protective system of each station is the carrier frequency communication equipment which cooperates with the relays mounted on the switchboard. In accordance with our invention, the carrier equipment and all the parts carrying carrier current are left outside the station building and are mounted in a weatherproof outdoor cabinet in the switchyard near the point where the carrier connection to the incoming high voltage line is made.

The outdoor cabinet in which the carrier equipment is mounted is indicated in Fig. 2 by a dotted rectangle OC, and its arrangement as used in practice is shown and described in our copending application, Serial No. 716,798 filed March 22, 1934.

The carrier equipment of each station is shown comprising a transmitter T and a receiver R which are coupled to the transmission line Lmnl through a carrier transformer winding 41 connected in series with a tuning coil 42 and a coupling capacitor 43 between one of the line phases, phase 1, for instance, and ground G, the lead between the capacitor 43 and the tuning coil 42 being protected by gap-switch grounding units 44, 44', a ground-leak coil 45, and a fuse switch 46.

The transmitter T may consist of a master oscillator having an oscillator tetrode OT generating oscillatory carrier currents of a predetermined frequency and supplying its output through a coupling transformer 46 to the input circuit of two push-pull connected amplifier tetrodes AT of a power amplifier which supplies corresponding amplified oscillatory carrier energy through output windings 49 over carrier transformer winding 41, and capacitor 43 to the power line along which the carrier energy is transmitted to the opposite station. A wave trap, comprising an inductance 50 and a capacitor 51 interposed between the circuit breaker Cmnl and the connection between coupling capacitor 43 and phase 1 of line Lmnl, prevents carrier energy from entering the station busses and the adjacent line sections.

The oscillator tetrode OT and the amplifier tetrodes AT have each a hot cathode 53, an anode 54, a control grid 55 and a screen grid 56 which are supplied with suitable direct current potentials through a potentiometer circuit including the resistors 57, 58 connected across leads 60 and 61 extending from the battery bus bars A, B. The cathodes 53 of the three tubes are interconnected with the common lead 61 from the negative bus bar B, and the control grids 55 of the amplifier tubes AT receive additional negative bias from an auxiliary source, such as bias battery B1. The oscillator tetrode OT has in its anode circuit a tuned tank circuit including inductance coil 62 and adjustable condenser 63 which determine the frequency of the carrier oscillations.

The screen grids 56 of the three tubes OT and AT are maintained at the proper positive operating potential by a lead 66 connected to the intermediate point 67 of the potentiometer resistors 57, 58. A lead 70 between the tank coil 62 and common lead 61 from the negative bus bar B, a grid-leak resistor 71, bypass condensers 72, blocking condensers 73, choke coil 74 complete the circuits of the oscillator tube OT, and a bypass condenser 72a completes the circuits of the amplifier tubes AT.

The carrier receiver R may have a combined detector and amplifier tube DT having a cathode 75 and a control grid 76 connected to a tuned input circuit 77 coupled through an intermediate tuned circuit 78 to the carrier transformer winding 41 for impressing on the input circuit oscillatory carrier currents received over the power line from the opposite station N. The anode 78 and cathode 75 of detector tube DT are connected to an output circuit 79 including the actuating coil 33 of the receiver relay RC for holding the receiver relay contacts 34 open upon reception of carrier from the opposite station N or from local transmitter at station M, screen grid 80 being maintained at the proper potential to secure efficient operation of the detector tube DT.

The three transmitter cathodes 53 and the detector cathode 75 are heated by filamentary heaters 83 and 84, respectively, which are connected in series with each other and in series with resistors 86 and 87 across the leads 60 and 61 from the station battery busses A and B. The detector cathode 75 is maintained at a suitable potential by connecting it to filament 84.

The circuit connections of the detector tube DT maintain it continuously in operative condition so that carrier frequency oscillations of the frequency to which the detector circuit is tuned will be received by the receiver R and produce in its output circuit 79 a current flow sufficient to energize the coil 33 of the receiver relay RC to open its contacts 34 and to keep the contacts open as long as carrier of the proper frequency is received.

The circuit connections of the transmitter tubes OT and AT keep the cathode heaters continuously energized and the tubes are therefore at all times ready to operate. The anodes 54 of the three transmitter tubes OT and AT are connected through a lead 90 over the contacts 13 of the power-directional relay PD to the positive battery bus A and are energized only when the contacts 13 are closed. The potentiometer resistors 57 and 58 are so proportioned that when connected in series across the leads 60 and 61 to the battery busses while the anodes 54 are energized by closure of directional relay contacts 13, the control grids and the screen grids of the three transmitter tubes have applied to them potentials which instantaneously set and maintain the master oscillator in an oscillatory condition and cause oscillations to be amplified and impressed over the coupling transformer 41 and the capacitor 43 on the transmission line, transmitting sufficient carrier energy to the opposite station N for actuating its receiver R to open the contacts 34 of the associated receiver relay RC. The several elements of the transmitter circuits are designed to cause the oscillations and the transmission of carrier energy to be instantaneously stopped and to hold the tubes in non-oscillating condition either upon opening the anode supply lead 90 at the directional relay contacts 13, or upon applying a blocking potential to the screen grids 56 of the three transmitter tubes OT and AT, for instance, by short-circuiting the potentiometer resistor 57 through the circuit over the three normally closed sets of contacts 24 of the three current relays CT and CTG.

The details of construction of the transmitter, receiver and the coupling capacitor do not constitute the subject matter of the present invention. They may be of any of the different forms well known in the art in connection with carrier frequency transmission and reception and do not require special modulation of the transmitted high frequency current. For use in the system of protection here described, the carrier equipment must merely meet the following requirements:

(a) No transmission of carrier should take place while contacts 13 of the power-directional relay PD are open;

(b) No transmission of carrier should take place while the contacts of all three current relays CT and CTG are closed;

(c) Instantaneous opening of any of the three contacts 24 of the three current relays CT and CTG while contacts 13 of the power-directional relay are closed should instantaneously start transmission of carrier to the station at the other end of the line section.

In the system of protection described above, the various elements operate as follows:

The power-directional relay PD has only one function, namely to apply positive plate voltage from the bus bar A to the anodes 54 of the three transmitter tubes OT, AT when the contacts 13 of the power-directional relay are closed, and to remove the plate voltage from the three transmitter tubes when relay contacts 13 are open.

The three current tripping relays CT and CTG are employed for four different functions.

When the current in a line phase or the ground phase has exceeded a predetermined value, one or more of the fault responsive relays CT, CTG has its actuating coil 20 sufficiently energized to open its normally closed contacts 22, 23, 24 within less than ½ cycle and to close its normally open contacts 21, performing the following operations:

(a) The opening of the normally closed contacts 23 in less than ½ cycle removes the voltage restraint from the power-directional relay coil 12, thereby making the power-directional relay more sensitive in its response to the magnitude of the power flow in the line section;

(b) The opening of the normally closed contacts 22 in less than ½ cycle de-energizes the normally energized coil 33 of the receiver relay RC and allows contacts 34 which are normally held open by the energization of the coil 43 to close if no carrier energy is received by coil 33 from the receiver R;

(c) The opening of the normally closed contacts 24 in less than ½ cycle removes the blocking potential from the screen grids 56 of the three transmitter tubes of the transmitter and allows them to become positive with respect to the cathodes of the transmitter tube, starting instantaneously the generation of carrier energy and its transmission by way of the coupling condenser 43 to the receiver of the station at the other end of the line section if the contacts 13 of the associate power-directional relay PD are closed;

(d) The closing of the normally open contacts 21 within approximately 1 cycle trips the oil circuit breaker Cmn1 at the associated station if contacts 34 of the receiver relay RC are closed.

The transmitter T at station M transmits carrier energy only when the contact 13 of the power-directional relay PD are closed and one or more contacts 24 of the tripping relays CT and CTG are open. Accordingly, transmitter T at station M will transmit only when the direction of power flow is from line Lmn1 into bus bar Bm and the current in line Lmn1 has reached a predetermined value.

The voltage restraint coils 12 of the power-directional relay 13 are energized to hold contacts 13 of the relay normally closed and ready to transmit if any one of the contacts 24 of the fault responsive relays CT, CTG open, provided the direction of the power flow is from the line into the bus of the associated station. Thus by holding the contacts of the power-directional relay normally closed, transmission of carrier is started instantaneously upon opening of any one of the contacts 24 of the three relays CT, CTG.

The actuating coil 33 of the receiver relay RC is normally energized by the closed contacts 22 of the three fault responsive relays CT, CTG connected across the station battery to hold the contacts 34 of the receiver relay normally open.

In case the line or ground current exceeds a predetermined value and one of the relays CT, CTG operates to open its contacts 22, thereby de-energizing the battery circuit supplying coil 33 of receiver relay RC, and if no carrier energy is received by coil 33 of the receiver relay, its contacts 34 will close to allow the tripping of the oil circuit breaker Cmn1 as soon as contacts 21 of any one of the relays CT, CTG close. If carrier energy is received by coil 33 of the receiver relay RC when its local energizing circuit through the current relay contacts 22 has opened, contact 34 of the receiver relay will remain open, thus preventing tripping of the oil circuit breaker Cmn1.

In order to take care of special fault conditions that occur on some transmission line systems due to a reversal of power flow when a faulty section is disconnected, or due to out of synchronism conditions, there is also provided a lock-out relay LO, which is normally de-energized, has its normally closed contacts 32 connected in series with the tripping circuit leading over the receiver relay contacts 34 and opens its contact after a time delay of 3 to 6 cycles only upon the energization of its coil 31 by the closure of the tripping contacts 21 of one of the instantaneous tripping relays CT, CTG.

Assuming now a single-circuit polyphase transmission line including sections Lmk1, Lmn1 and Lno1 with the circuit breakers at each station equipped as described in connection with Fig. 2 hereinabove, the operation of the system will be as follows: Under normal line conditions the power-directional relay PD will have its contacts 13 closed, the current relays CT, CTG will have their contacts 22, 23, 24 closed and contacts 21 open, the lock-out relay will have its contacts 32 closed, and receiver relay RC will have its contacts 34 open. Under these conditions no carrier energy is transmitted at either station.

If a phase to phase fault, such as a short-circuit, occurs on a line section Lno1 beyond station N, an abnormal current flow will ensue from line section Lmk1 through line Lmn1 and the portion of the line section leading from station N to the point of short-circuit on line Lno1. This abnormal current will immediately actuate at each of the two stations M and N the instantaneous-acting fault responsive over-current relay CT and the high speed power-directional relay PD.

At station M the power flows from the bus bar Bm into the line Lmn1 causing the instantaneous over-current relay CT of line Lmn1 to open its contacts 22, 23, 24 and the power-directional relay PD to open its contacts 13, thus preventing transmission of carrier from station M. At the instant contacts 22, 23, 24 on the over-current relays CT open, receiver relay RC is de-energized from the local battery circuit and voltage restraint is removed from the power-directional relay PD.

At station N the power flows from the line Lmn1 into the bus bars Bm causing the instantaneous over-current relay CT to quickly open its contacts 22, 23, 24 while holding closed contacts 13 of the power-directional relay PD. The instant contacts 22 of one of the actuated over-current relays CT at station N open, the local battery circuit of the receiver relay is de-energized, contacts 23 open removing voltage restraint from the power-directional relay, and lock-out contacts 24 open starting the carrier transmitter at station N. The carrier energy transmitted from station N over power line section Lmn1 will be received instantaneously by the receiver at station M and as a result the receiver at station M will energize the actuating coil 33 of the associated receiver relay 34 preventing the receiver relay RC from closing its tripping contacts 34 before the tripping contacts 21 of the phase over-current relays CT have closed, thus preventing tripping of circuit breaker Cmn1. The local tripping circuit at station N is held open because its receiver relay RC is energized by carrier energy from its local transmitter T. The transmitter at station N is thus quickly started at the very inception of the fault and energizes by carrier flowing over the line section the receiver relay RC at station M holding its contacts open before tripping contacts 21 of its current relay CT have closed.

Tripping of the circuit breakers Cmn1 at station M and Cnm1 at station N is thus prevented by the tripping contacts 34 of the receiver relays RC remaining open at both stations. The line section Lmn1 stays intact.

Should the fault on line section Lno1 be a phase to ground fault, then a ground current will flow from station M through line Lmn1 to station N and through line Lno1 to the fault. The operation of the protective system will be exactly the same as for the phase to phase fault except that the ground fault relay CTG will operate instead of the fault responsive relay CT. If the ground current flowing under such conditions is large enough and flows through one of the phase over-current relays CT, the actuated phase over-current relay CT will operate simultaneously with the ground current tripping relay CTG, setting into action the same sequence of operation as described above.

If a phase to phase fault occurs on the line section Lmn1 between stations M and N, an abnormal current flow will ensue from the bus bars Bm at station M and from the bus bars Bn of station N into the line section Lmn1 to the point of fault. This abnormal current will immediately cause each of the two stations to actuate the over-current relays of the affected line conductors and also the high speed power-directional relays PD. At both stations contact 13 of the power-directional relays PD will open, thus preventing transmission of carrier from either station. Contacts 22 of the over-current relays CT at both stations will open, thereby de-energizing the local actuating circuits of the receiver relays RC, thus causing the tripping contacts 34 of the receiver relay RC of each station to close. Within ½ cycle later tripping contacts 21 of the over-current relay CT at both stations will close, thereby tripping the two circuit breakers Cmn1 and Cnm1 at the two stations and cut out the faulty section Lmn1.

If a phase to ground fault occurs on the line section Lmn1 between stations M and N, then a ground current will flow from the bus bars Bm at station M and from the bus bars Bn of station N into the line section Lmn1 to the point of the fault. The operation of the system will be exactly similar to that of a phase to phase fault except that the ground current relays CTG at both stations will operate instead of the phase over-current relays CT.

Since the tripping of the circuit breaker is determined by the operation of the receiver relay RC which holds the tripping circuit open at its tripping contacts 34 while energized either through the normally closed contacts 23 of the fault responsive relays or through the actuation by carrier when the directional relay contacts 13 are closed, the additional use of the parallel connected tripping contacts 21 of the three fault responsive relays for controlling the tripping circuit is optional and may be omitted. In such case the tripping circuit through tripping coil 10 is controlled only by the receiver relay RC, which holds the tripping circuit open when energized by the local battery or carrier, and closes its contacts 34 to trip the circuit breaker upon de-energization of the receiver relay.

With a system as described above in connection with Fig. 2, each protected line section will remain connected in the line if the fault lies outside the line section, and in case of a fault on the line section the carrier relay system will close the tripping circuit of the circuit breakers at the ends of the faulty section within 1 cycle, enabling high speed circuit breakers to cut out the faulty line section in about 4 cycles or less and thus preventing the otherwise intact part of the transmission line system from becoming unstable.

The lock-out relays LO at the two section ends do not affect the instantaneous protective action of the other main relays of the system because the time delay of these relays is substantially larger than the time required to clear the fault. Such lock-out relays serve to protect the line section against false tripping due to the reversal of the power flow in the line section that may occur upon the opening of the circuit breakers on an external faulty line section or due to out of step conditions when synchronous apparatus in different parts of the system fall out of step with each other. In such case, the protected section would be without carrier energy due to the reversal of directional power relays at both stations while the tripping relays are still in the closed position, and tripping of a sound line section might thus occur. In systems with two parallel circuits, incorrect tripping due to sudden reversal of power flow in a line section is prevented by providing such lock-out relays on the section ends of each circuit and energizing both lock-out relays by the instantaneous tripping relays of both line circuits.

The simple protective arrangement against false tripping due to apparent fault condition by the use of lock-out relays described above or similar elements, and the principles underlying the protective combination using such arrangement described in connection with Figs. 2 to 6 constitutes the subject matter of our copending application.

Such system will give reliable and rapid protection against phase to phase as well as phase to ground faults on line sections in which the normal ground current is more than twice the normal line current. In all such cases a single power-directional relay will give the required protection, avoiding the use of more complicated systems requiring additional space, costs and supervision.

Figure 3:
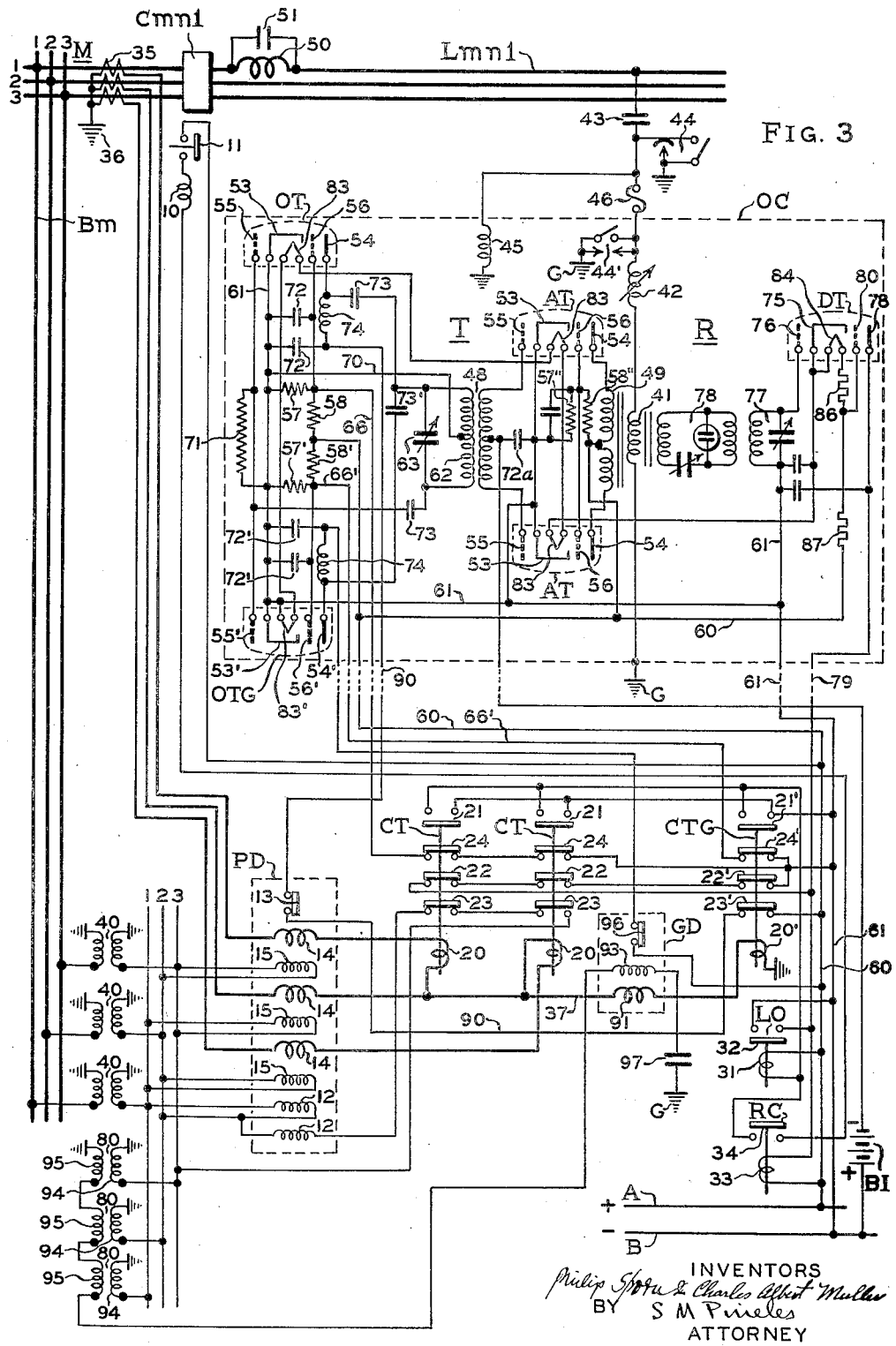

The system of protection shown in Fig. 3 supplies in addition to the phase fault protection given by the system of Fig. 2 a more sensitive ground fault protection which is particularly important for conditions where the minimum ground fault currents are less than twice the normal load currents over the line section. As seen in Fig. 3 the power-directional relay PD and the over-current relays CT are arranged and connected in the same way as the corresponding elements of the system shown in Fig. 2. There is further provided an additional ground-directional relay GD which has a current coil 91 connected in the ground lead 37 of the current transformer windings 35 to be actuated by the ground currents flowing in the line.

The ground-directional relay has also a potential coil 93 which in case of a ground fault has applied thereto zero sequence voltages derived from three auxiliary single-phase potential transformers 90 having primary windings 94 connected in star and secondary windings 95 connected in delta. The ground-directional relay GD is arranged to be actuated to open its contacts 96 upon the flow of ground current in the direction from the bus bars Bm into the line section Lmn1 and to keep the contacts 96 closed if ground current flows in opposite direction. The current coil 91 and the potential coil 93 of the ground-directional relay act inductively on a disc to rotate in one or the opposite direction depending on the direction of the ground current flow corresponding to the current and voltage applied to the actuating coils 91 and 93. A condenser 97 is provided in series with the potential coil 93 to obtain maximum torque at a predetermined power factor. Type IBC—22 directional ground relay of the General Electric Company may be used for this service.

The ground protection also includes a ground current relay CTG, similar to that used in the system of Fig. 2, which has an actuating coil 20' arranged to close its contacts 21' and to open its contacts 22', 23', 24' upon flow of predetermined currents and may be of the same type as the ground current relay used in the system of Fig. 2. The ground current relay CTG has its actuating coil 20' connected in the residual ground lead 37 and has its contacts 21' normally open and contacts 22', 23', 24' normally closed.

The carrier equipment in each station is similar to that shown in Fig. 2 and comprises a receiver R, like that of Fig. 2, and a transmitting arrangement having two separate oscillator tubes OT and OTG connected to be individually controlled in a way similar to the system of Fig. 2. The transmitters may be two entirely independent transmitter units, each connected exactly as shown in the system of Fig. 2, or as indicated in Fig. 3, the two independently controlled oscillator tubes OT and OTG may be combined with a single set of two push-pull connected amplifier tubes AT connected to amplify the oscillations received either from the oscillator OT or from the oscillator OTG and to transmit the amplified oscillatory carrier energy over the power line section Lmn1 to the receiver at the opposite station. The cathode 53' and the control grid 55' of the master oscillator tube OTG are connected in a way similar to the oscillator tube OT, the heating filament 83' of the oscillator tube OTG being connected in series between the negative lead 61 and filament 83 of the oscillator tube OT. Suitable potentials are supplied to the screen grids 56 and 56' of the two oscillator tubes by potentiometer elements 57, 58 and 57', 58', respectively, connected between the negative battery lead 61 and the positive battery lead 60. Both oscillator tubes are arranged to feed the amplifier tubes AT over the same coupling transformer 48.

In distinction from the arrangement shown in Fig. 2, the two amplifier tubes have their screen grids 56 maintained at the proper positive potential by means of an independent set of two potentiometer resistors 57'', 58'' permanently connected between the negative battery lead 61 and the positive battery lead 60. A common lead 70 serves the circuits of both master oscillator tubes OT, OTG. The oscillator tubes will not oscillate unless potential is applied to the oscillator plates and no blocking potential is applied to the screen grids 56, 56' of the two oscillator tubes.

Positive potential is applied to the oscillator tube OT by a lead 90 connected to the positive battery terminal A over the contacts 13 of the power-directional relay PD and the interlocking contacts 23' of the ground fault relays CTG. A blocking potential is applied to the screen grid 56 of the oscillator tube OT through lead 66 connected to the negative battery lead 61 over the serially connected contacts 24 of the two overcurrent relays CT. In a similar way a blocking potential is applied to the screen grid 56' of the oscillator tube OTG over lead 66' connected to the negative battery lead 61 over the contacts 24' of the ground current relay CTG.

As in the system of Fig. 2, the contacts 22 and 22' of the three current relays CT, CTG connect, when closed, the actuating coil 33 of the receiver relay RC to the local battery leads 60, 61 holding the relay contacts 34 and therethrough the tripping circuit open. The actuating coil 33 of the receiver relay RC is independently energized to hold its tripping contacts 34 open if it is supplied with carrier energy from the receiver R.

The phase power-directional relay PD has the only function to apply positive plate voltage from the bus bar to the anode 54 of the oscillator OT when the contacts 13 of the power-directional relay are closed, and to remove the plate voltage from the oscillator tube OT when relay contacts 13 are open.

Under normal line conditions the two phase current relays CT are in the downward position and hold open the tripping circuit of the circuit breaker Cmn1 at their open tripping contacts 21; applying a blocking potential to the screen grid 56 of the oscillator tube OT at the closed contacts 24 preventing oscillation of the tube; hold closed at their closed contacts 22 the local energizing circuit of the coil 33 of the receiver relay RC holding open the receiver contacts 34 of the tripping circuit; and at their closed contacts 23 they energize one of the voltage restraint coils 12 to maintain the power-directional relay contacts 13 closed so as to energize the plate circuit of oscillator tube OT.

The ground-directional relay GD is arranged to hold its contacts 96 closed when de-energized and also upon flow of ground current in the direction from line section Lmn1 into the bus bar Bm and thus apply a positive potential to the anode 54' of the oscillator tube OTG and thereby place it in a condition to start to oscillate upon the removal of the blocking potential from its screen electrode 56'. Under normal conditions the ground current relay CTG holds the tripping circuit open at its open tripping contacts 21'; prevents oscillation of the oscillator tube OTG by applying a blocking potential to screen grid 56' through lead 66' connected over its normally closed lock-out contacts 24' to the negative battery lead 61; holds closed at its contacts 22' the local energizing circuit of coil 33 of receiver relay RC to maintain open tripping contacts 34 of the receiver relay and completes at its closed contacts 23' the connection of the anode 54 of the oscillator tube OT by way of power-directional relay contacts 13 to the positive battery leads 60 for applying a positive potential to the oscillator tube OT.

Assuming normal line conditions and power flowing like in the system of Fig. 2 in the direction from line Lmk1 to section Lno1, the circuit breakers at both ends of section Lmn1 will stay closed. No carrier is transmitted from either station because in both stations blocking potential is applied to the screen grids 56 and 56' of both master oscillator tubes OT and OTG, respectively.

If a phase to phase fault, such as a short-circuit, occurs on a line section beyond station N, the power-directional relays PD, the two phase fault relays CT and the receiver relay RC will operate exactly in the way the similar relays and carrier devices of the system of Fig. 2 operated to maintain line section Lmn1 intact and prevent it from becoming disconnected from the system because of its abnormal current flow through it. If the fault lies within the line section Lmn1, then instantaneous tripping of the circuit breakers of both stations will be produced in the same way as it is produced by the corresponding apparatus as described in connection with the system of Fig. 2. If the fault involves only the phase conductors of the line and does not involve a ground, the ground responsive relays GD and CTG are not called upon to function and the ground fault oscillators OTG at the two stations do not transmit.

Should a ground fault occur on the transmission line including line section Lmn1, the ground fault relay 21' at each of the stations of section Lmn1 becomes instantaneously energized opening at its contacts 23' the lead connection 90 over the power-directional relay contact 13 to the oscillator tube OT making impossible operation of the oscillator tube OT and confining the control of the tripping and the carrier transmission to the operation of the ground current relay CTG and of the ground-directional relay GD in each of the stations on both ends of the line section.

In case a ground fault occurs beyond station N, an abnormal current will flow from the line section Lmk1 through line Lmn1 into the line section Lno1. At both stations M and N of the line section Lmn1, the abnormal ground current will instantaneously energize the ground fault relays CTG, instantaneously opening the contacts 22', 23', and 24' and starting the closing of the tripping contacts 21'.

The opening of the contacts 23' at the two stations M and N instantaneously opens the plate circuit of the phase oscillator tubes OT at the two stations, thus preventing the operation of the two oscillator tubes OT at each station and confining the control of the operation of the carrier generation at the two stations to the ground-directional relays GD of the two stations M and N; simultaneously the contacts 22' of the ground relays CTG of the two stations open the local energizing circuit of the associated receiver relay RC allowing it to close its tripping contacts 34 if no carrier is received.

At station M the ground current flows from the bus bars Bm into the line Lmn1 causing the ground-directional relay GD to open its contacts 96, thus preventing transmission of carrier at station M.

At station N the ground current flows from the line Lmn1 into the bus bars Bn causing the ground-directional relay GD to keep its contacts 96 closed, thereby applying a positive potential to the plate 54' of the local ground master oscillator OTG. Simultaneously the opening of the lock-out contacts 24' of the ground tripping relay CTG at station N removes the blocking potential from the blocking grid 56' of the master oscillator OTG at station N setting it instantaneously into oscillations and transmitting carrier to the receiver of station M and to its own local receiver at station N, thereby energizing the coils 33 of the receiver relays RC at stations M and N and preventing the tripping of the two circuit breakers at the two stations. In this way each line section is positively prevented from being disconnected in case the ground fault occurs outside of the line section.

Should the ground fault occur on line section L*mn*1 between stations M and N, an abnormal ground current will ensue from the bus bars B*m* of station M and from the bus bars B*n* of station N into the line section L*mn*1 to the point of fault. This instantly actuates at both stations the ground current relays CTG, thereby opening contacts 23', thus de-energizing the plate circuit of the phase oscillator tube OT and confining the operation and control of the carrier transmission to the ground carrier oscillator OTG and to the ground-directional relay GD of each station. Since the ground-directional relays GD at both stations are now energized by ground currents flowing from the busses to the lines, their contacts 96 are immediately opened, preventing the ground master oscillators OTG at the two stations from transmitting. Simultaneously the ground current relays CTG at the two stations instantaneously open at their contacts 22' the local energizing circuit of the receiver relay coil 33 permitting the receiver relay tripping contacts 34 to instantaneously close at both stations. At the same time the tripping contacts 21' of the ground current relays CTG at the two stations quickly complete the tripping circuit of the circuit breakers of the two stations, causing the two breakers to open and cut out the faulty section within the short period of 1 cycle or less required to energize the tripping circuit of the circuit breakers.

Protection against false tripping due to a sudden reversal of power flow in a line section like that secured by the time-delay lock-out relays LO in the system of Fig. 2 may be obtained by connecting in each section end such relay to control the tripping circuit of Fig. 3, in the way shown in Fig. 2, or in a modified way illustrated in Fig. 3.

In accordance with the arrangement of Fig. 3, the time-delay lock-out relay LO, having a normally de-energized coil 31 connected to be energized upon closure of the tripping contacts 21, 21' of either one of the instantaneous current relays CT, CTG, has normally open contacts 32 connected to establish in closed position an additional energizing circuit for the actuating coil 33 of the receiver relay RC. Thus, the lock-out relay LO will not affect the operation of the instantaneously-acting main relays of the system and will close its contacts 32 and energize the receiver relay coil 31 only after a predetermined delay of 3 to 6 cycles after the energization of its coil 31 by tripping contacts 21 of one of the instantaneous current relays CT, CTG to prevent tripping of the section that may occur due to the reversal of the power-directional relays at both section ends and cessation of carrier transmission upon sudden power flow reversal.

In modern electric power systems conditions often arise under which it is impossible to secure the desired protection with current responsive fault relays, for instance, in cases where the maximum load current on a line section is nearly equal to or greater than the minimum short-circuit current obtainable, or where sudden load swings bring about undesired relay actions. The protective system exemplified by the arrangement described in connection with Fig. 4 overcomes these difficulties by using voltage relays for controlling the tripping action and the carrier operation of the protective system in case of phase to phase faults.

This mode of phase protection depends on the utilization of the drop of a phase voltage below a predetermined value of normal voltage for setting into action the control of the tripping and the carrier transmission. Under the conditions described hereinabove, the drop of the phase voltage is a much more definite indication that a phase to phase fault exists on system than the change in the magnitude of the line current. By the use of the under-voltage relays, a very flexible protection system is obtained which permits choice of settings that will take care of practically any condition that may arise on the system.

This system of phase protection by under-voltage relays in combination with a sensitive relay for ground protection which takes over the control of the carrier transmission when a ground fault exists on the system assures complete protection under all conditions. It enables obtaining of high sensitivity protection on double circuit lines where one circuit carries at times the full load which is larger than the short-circuit current that could normally occur on line and under similar conditions where the short-circuit current from one station is less than the normal line current or abnormal currents caused by sudden load swings due to instability. Complete protection under such conditions can be obtained only if, in case of phase faults, the control of the tripping is made dependent only on the voltage of the system. With this system the magnitude of the load that may be taken over a line section is unlimited so long as the phase voltages at the station do not drop below a predetermined value for which the undervoltage relays have been set.

Figure 4:
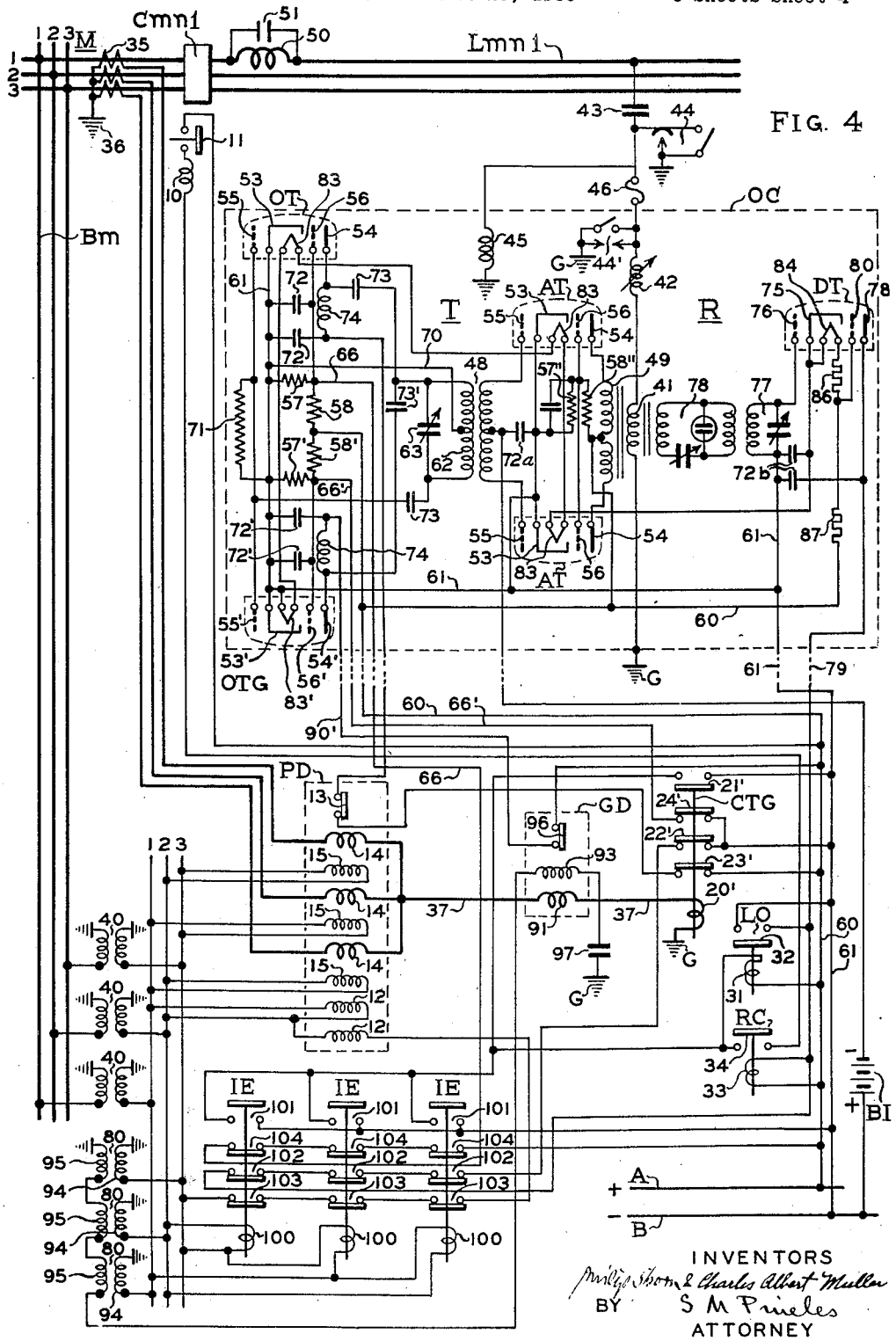

The arrangement of a station at one end of a line section having such protection system is shown in Fig. 4. It comprises all the elements of the carrier equipment, the power-directional relay PD, the ground-directional relay GD, the ground current relay CTG, and carrier actuated receiver relay RC and the various connections therebetween, like those shown in the system described in connection with Fig. 3.

In case of ground faults the protection supplied by the system of Fig. 4 operates in the same way as the ground protection supplied by the system of Fig. 3.

In order to secure reliable protection for phase faults under conditions where current responsive relays have not the desired degree of reliability, the station equipment of the system exemplified in Fig. 4 is provided with a set of under-voltage relays IE, each having an actuating voltage coil 100 arranged to instantaneously open three independent sets of contacts 102, 103, 104, and to close within about 1 cycle or less a set of tripping contacts 101 when the voltage applied to the voltage coil 100 drops below a predetermined value. Type PQ plunger relays of the General Electric Company and type SV plunger relays of the Westinghouse Company are suitable for this purpose.

The voltage coils 100 of the three relays IE are connected to the low voltage bus bars of three star-connected potential transformers 40 which also supply the coils 12, 15, of the power-directional relay PD at the station. Under normal line conditions, when the voltage of all line phases is above a predetermined value, for instance, above 80% of normal line voltage, the three relays IE hold their contacts 102, 103, 104 closed and contacts 101 open. When one of the three phase to phase voltages drops below the predetermined set value, contacts 102, 103, 104 of the relay IE of the affected phases are instantaneously opened and contacts 101 close within about 1 cycle or less.

Under normal line condition the contacts of the three voltage relays IE are in the upward position and, in a way analogous to Fig. 3, hold open the tripping circuit of circuit breaker Cmn1 at their open contacts 101; apply a blocking potential to the screen grid 56 of the phase master oscillator tube OT at the closed lock-out contacts 104 preventing oscillation of the tube OT; hold closed at their closed contacts 102 the local energizing circuit of the coil 33 of the receiver relay RC holding open the receiver tripping contacts 34 of the tripping circuit; and at their closed contacts 103 they energize one of the voltage restraint coils 12 to maintain the contacts 13 of the power-directional relay closed energizing the plate circuit of oscillator tube OT. In case of a phase to phase fault causing one of the phase to phase voltages to drop below a predetermined minimum value, for instance, 80% of normal voltage, the actuating coil 100 of the relay IE of the affected phase returns to its downward position, instantaneously opening its contacts 102, 103, 104 and closing its contacts 101 within 1 cycle or less.

The power-directional relay PD has its contacts 13 closed under normal conditions. It has the only function to apply positive voltage from the bus bar to the anode 54 of the phase-fault master oscillator tube OT when its contacts 13 are closed, and to remove the plate voltage from the oscillator tube OT when its contacts 13 open.

Assuming now a single circuit line, including sections Lmk1, Lmn1 and Lno1, the circuit breakers at each station being equipped as described in connection with Fig. 4 hereinabove, the operation of the system will be as follows:

Let it be assumed that the transmission line sections are all intact and that most of the time there is normal power flow along the transmission line from line sections Lmk1 by way of station M through line sections Lmn1 through station N into line section Lno1, and from there through to other stations. So long as the magnitude of power flow over line sections Lmn1 is not sufficient to drop the phase voltages at bus bars Bm at station M, or Bn at station N, below a predetermined value, no carrier current will be transmitted or received at either station, nor will any circuit breakers at either station trip.

If a phase to phase fault occurs on the line section Lno1 beyond station N, immediately one of the phase to phase voltages at the bus bars Bm and Bn drops sufficiently to actuate one or more of the voltage relays IE at both stations M and N. Further, an abnormal current flow will ensue from line sections Lmk1 through line Lmn1 and the portion of the line section leading from station N to the point of short-circuit on line Lno1.

The actuation of the relays IE at the two stations M and N instantaneously opens at contacts 103 the circuits of one of the restraining coils 12 of the directional relays PD at each station, increasing their sensitivity; and instantaneously opens at contacts 102 the local energizing circuit of the associated receiver relay RC allowing it to close its tripping contacts 34 if no carrier is received.

At station M the power flows from the bus bars into the line Lmn1 causing the power-directional relay PD to open its contacts 13, thus preventing transmission of carrier by the master oscillator OT at station M.

At station N the power flows from the line Lmn1 into the bus bars Bn causing the power-directional relay PD to keep its contacts 13 closed, thereby maintaining a positive potential on the plate 54 of the local phase master oscillator OT. Simultaneously, the opening of the contacts 104 of the under-voltage relay IE at station N removes the blocking potential from the blocking grid 56 of master oscillator OT at station N, setting it instantaneously into oscillations and transmitting carrier to the receiver of station M and to its local receiver at station N, thereby energizing the coils 33 of the receiver relays RC at stations M and N and preventing the tripping of the two circuit breakers at the two stations M and N. In this way the line section Lmn1 is positively prevented from being disconnected from the system in case the phase to phase fault lies outside the line section.

Should the phase to phase fault occur on line section Lmn1 between stations M and N, an abnormal power flow will ensue from the bus bars Bm and Bn of both stations into the line section to the point of fault, and the phase to phase voltage at both stations will drop below the predetermined setting. This causes instantaneous opening of the contacts 13 of the power-directional relays PD at both stations, thereby preventing transmission of carrier from either station. Simultaneously, the under-voltage relay IE at the two stations instantaneously actuated open at contacts 102 the local energizing circuits of the associated receiver relay coils 33 permitting their tripping contacts 34 to instantaneously close at both stations, while the immediately following closure of tripping contacts 101 of the two relays IE completes the tripping circuits at both stations, thereby starting the tripping action of the circuit breakers within the short period of 1 cycle or less required to energize the tripping circuits.

In case of a ground fault, the system of Fig. 4 operates exactly like that of Fig. 3, the ground tripping relay CTG taking over the control action in operating the elements of the system.

As in the system of Figs. 2 and 3, the use of the parallel tripping contacts 21', 101 of the fault responsive relays IE, CTG for controlling the tripping circuit is optional and may be omitted, leaving only contacts 34 of the receiver relay RC in the tripping circuit for controlling the tripping of the circuit breaker, since in all arrangements only the open contacts 34 of the receiver relay are relied upon to prevent tripping while the relay is held energized through the closed contacts of the fault responsive relays or the directional relays.

Protection against false tripping upon sudden power reversal is obtained by the lock-out relays LO in the way described in the systems of Fig. 2 or 3.

Figure 5:
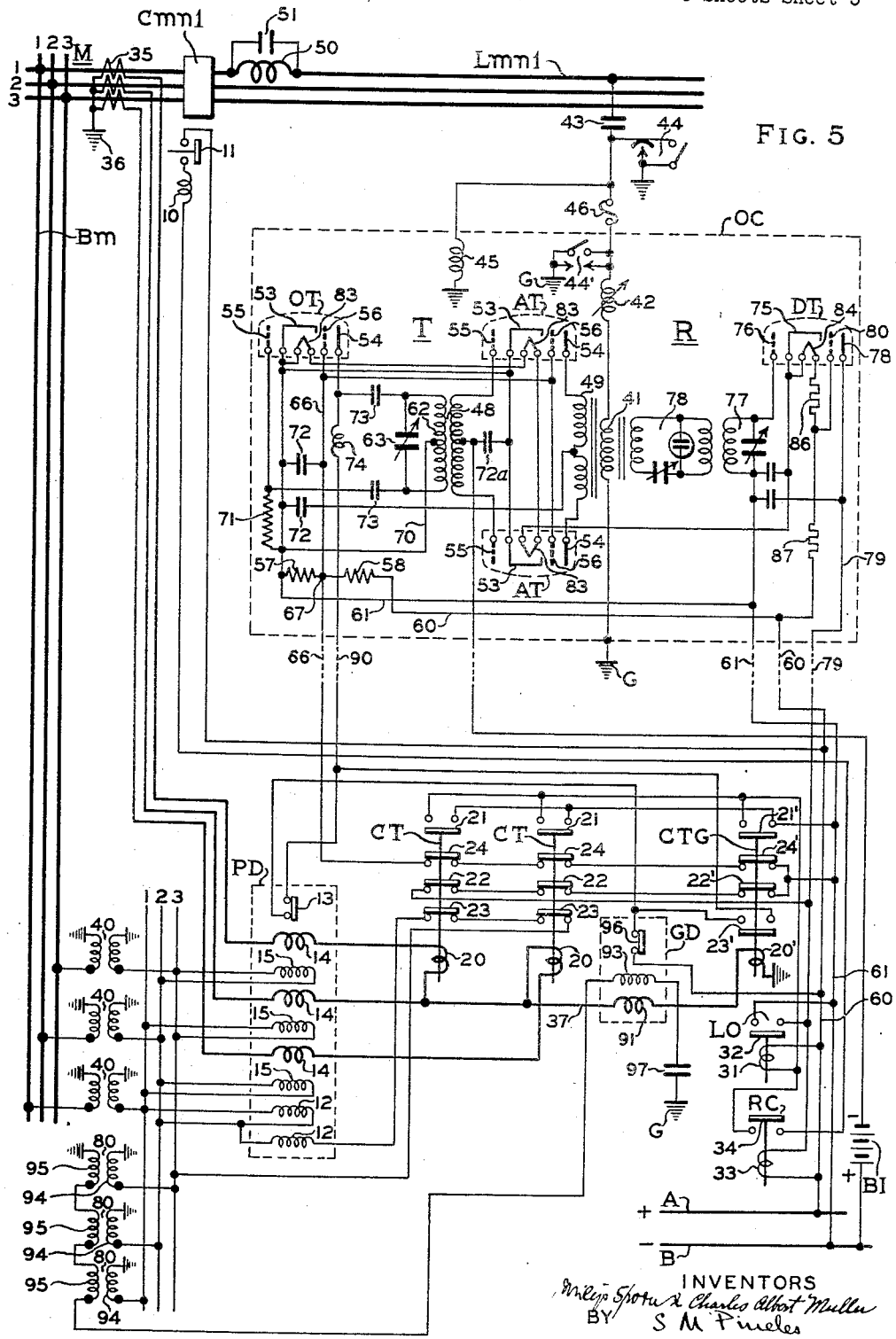

In Fig. 5 is shown a modified protection equipment for a section end of a power transmission line securing sensitive phase fault and ground fault protection like that obtained with the system of Fig. 3, using only one carrier master oscillator. The power-directional relay PD, the ground-directional relay GD, the phase fault and ground fault relays CT, CTG, the receiver relay RC and the lock-out relay LO and the principal interconnections therebetween are like those shown in Fig. 3. The carrier equipment OC comprises only a single master oscillator OT and is similar to that of Fig. 2.

In this arrangement the normally closed power-directional relay contacts 13 and the ground-directional relay contacts 96 are connected in series in the plate supply lead 90, and the normally open interlocking contacts 23' of the ground current relay CTG are connected parallel to the power-directional relay contacts 13 to cut out the control of this directional relay if contacts 23' are closed. Under normal conditions positive plate voltage is thus applied from the bus bar A to the transmitter tubes OT, AT, but they do not transmit because a blocking potential is applied to the screen grids 56 of these tubes through the lead 66 over the normally closed contacts 24, 24' of the three current relays CT, CTG.

In case of a phase fault, only the power-directional relay PD and the phase current relays CT are called into action, and they operate to protect the line section in the way described in connection with Fig. 3, because the ground-directional and current relays remain in their normal positions. In the event of a ground fault, the instantaneously-acting ground current relay CTG is energized to close its contacts 21' and 23' and short-circuit the power-directional relay contacts 13. The control of the tripping action is thus taken away from the power-directional relay and the ground current relay operates in conjunction with the ground-directional relay GD to protect the line section in the way described in connection with Fig. 3.

Fig. 6 shows a similar carrier control arrangement applied to an under-voltage protective system of the type described in connection with Fig. 4. The ground-directional relay GD, the fault responsive relay CTG, the receiver relay RC and the lock-out relay LO, as well as the instantaneously-acting under-voltage relays IE and their principal interconnections, are like those shown in Fig. 4. The carrier equipment OC comprises only a single master oscillator OT and is similar to that of Fig. 2. As in the arrangement of Fig. 5, the normally closed power-directional relay contacts 13 and the ground-directional contacts 96 are connected in series in the plate supply lead 90, and the normally open interlocked contacts 23' of the ground current relay CTG are connected parallel to the power-directional relay contacts 13 to cut out the control of the power-directional relay if contacts 23' are closed. Under normal line conditions, positive plate voltage is thus applied to the transmitter T, but it does not transmit because a blocking potential is applied to the screen grids 56 of the transmitter tubes through the lead 66 over the normally closed contacts 104 of the under-voltage relays and contacts 24' of the ground relay.

In case of a phase fault, only the power-directional relay PD and the under-voltage relays IE are called into action and they operate to protect the line section in the way described in connection with Fig. 3, since the ground-directional and current relays remain in their normal position.

In the event of a ground fault, the instantaneously-acting ground current relay CTG is energized closing its contacts 21' and 23', thus short-circuiting the power-directional relay contact 13 and confining the control of the tripping action to the operation of the ground-directional relay GD and the ground relay CTG which operate in the way described in connection with Fig. 3.

In each of the embodiments of the invention described above, a single simple and reliable tripping control relay controls the tripping of the circuit breaker at each end of the protected section. Upon the occurrence of a fault on the protected section, this relay is instantaneously de-energized, and in the short instant of approximately 1 cycle required for closure of its tripping controlling contacts, the circuit breaker is tripped. The action of this relay is controlled by the opening of normally closed contacts of a line-energized fault responsive relay and normally closed contacts of a line-energized directional relay which cooperate to hold the control relay energized, and prevent it from tripping the circuit breaker if the fault is outside the protected section.

By selectively energizing the tripping control relay through normally closed instantaneously-opening contacts of the fault responsive relay, the effectiveness of the system secures the advantages obtainable with continuous carrier while its disadvantages are avoided. Through the use of lock-out relays which cause reopening of the tripping circuit after a limited time delay, incorrect tripping of a sound line section due to power flow reversal is eliminated.

The present invention is directed to a protective system operating in accordance with the principles explained in connection with Fig. 1 and described in detail in the embodiments of the invention shown in Figs. 2 to 6. The combination of such protective system with means, such as the lock-out relays, for preventing disconnecting of sound line sections in the event of a reversal of the power flow that may occur upon the opening of a line interrupter on an external faulty section or due to an apparent fault caused by out of synchronism conditions, or due to other occurrences on the power transmission system outside the protected section, constitute distinct features of our invention and are not claimed in the present application but in a copending application.

In each of the exemplifications of the invention, the opening of the line interrupter means for disconnecting a line section from the transmission line is effected by trip means which are operative to maintain the tripping circuit open and prevent opening of the interrupter or to complete the trip circuit and effect the opening of the circuit interrupter for disconnecting the line section from the line. The trip means are normally restrained in a non-trip condition and prevented from opening the interrupter by opening restrain means which are actuated upon the occurrence of a fault to eliminate the restraining action which prevents the opening of the interrupter and permit the trip means to assume a trip condition in which it completes the trip circuit and effects the opening if the fault is within the line section. The trip means is, however, arranged to be prevented from assuming the trip condition and effecting the opening of the interrupter by an additional restrain exerted on occurrence of a fault in accordance with the location of the fault to prevent opening of the interrupter when the fault is outside the protected section.

No special devices or relays are required for operating the protective system of the invention. One of the great advantages of the protective system of the invention is the fact that it makes possible fast and positive clearing of a faulty transmission line section without the disturbance of the system by the use of devices and relays long known for great reliability in construction and performance. However, it also makes possible to accomplish the fast protective action with other devices and relaying means heretofore not considered reliable enough for transmission line protection.

The exemplifications of the present invention claimed herein will suggest to those skilled in the art many other arrangements and ways for establishing a normal opening preventive action which is eliminated on the occurrence of a fault, but is nevertheless selectively restored if the fault is outside the line section to secure fast protective action in accordance with the principles of the invention.

It is accordingly desired that the appended claims be given a broad construction commensurate with the scope of the invention.

We claim:

1. In a protective system for a section of an alternating current transmission line including line interrupting means for disconnecting the section from the line, electrically actuated tripping means operative to leave said interrupting means closed while said tripping means are energized and to cause opening of said interrupting means upon de-energization of said tripping means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of normally closed contacts actuated to open in accordance with the direction of energy flow in the line, and control means having a circuit portion including said normally closed contacts of said directional relay means for independently supplying actuating energy to said tripping means to cause selective opening of the interrupting means in accordance with location of a fault within or outside of said section.

2. In a protective system for a section of an alternating current transmission line having line interrupting means for disconnecting the section from the line, electrically actuated tripping means operative to leave said interrupting means closed while said tripping means are energized and to cause opening of said interrupting means upon de-energization of said tripping means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of circuit controlling contacts actuated to operate in accordance with the direction of energy flow in the line, and control means having a circuit element including said contacts of said directional relay means for independently supplying actuating energy to said tripping means to cause selective opening of the interrupting means only upon occurrence of a fault inside of said section.

3. In a protective system for a section of an alternating current transmission line, line interrupting means including an electrically actuated tripping circuit for opening said interrupting means to disconnect the section from the line upon completion of said circuit, tripping relay means having circuit contacts included in said tripping circuit operative to stay open while said relay means is energized and to close upon de-energization of said relay means for tripping said interrupting means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of circuit controlling contacts actuated to operate in accordance with the direction of energy flow in the line, and control means having a circuit element including said circuit controlling contacts of said directional relay means for independently supplying actuating energy to said tripping relay means to cause selective opening of the interrupting means in accordance with location of a fault within or outside of said section.

4. In a protective system for a section of an alternating current transmission line having at each section end line interrupting means including an electrically actuated tripping circuit for opening said interrupting means to disconnect the section from the line upon completion of said circuit, tripping relay means having circuit contacts included in said tripping circuit operative to stay open while said relay means is energized and to close upon de-energization of said relay means for opening said interrupting means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of contacts actuated in accordance with the direction of energy flow in the line, and control means having a circuit element including said contacts of said directional relay means for independently supplying actuating energy to said tripping relay means to cause selective opening of the interrupting means only upon occurrence of a fault inside of said section.

5. In a protective system for a section of a high voltage electric power transmission line system extending between two remote generating stations having at each station end line interrupting means including electrically energized tripping means for tripping said interrupting means to disconnect the section from the line upon de-energization of said tripping means, an energizing circuit for energizing said tripping means, line-energized fast-acting fault responsive relay means having a set of contacts included in said energizing circuit actuated to de-energize said circuit upon occurrence of a fault on the line irrespective of the direction of the power flow, line-energized directional relay means having a set of contacts actuated in accordance with the direction of the flow of power in said line, and control means comprising an energizing circuit portion including the contacts of said directional relay means for independently energizing said tripping means, said fault-responsive relay means cooperating with said directional relay means to selectively effect tripping of said interrupting means upon occurrence of a fault in said section and to prevent tripping of said interrupting means upon occurrence of a fault outside said section.

6. In a protective arrangement for an electric circuit including circuit interrupting means at one end of a section of the circuit, means for effecting the opening of said circuit interrupting means comprising fault-responsive means connected to be energized from the circuit, means for preventing the opening of the circuit interrupting means under predetermined circuit conditions, means for eliminating the preventive action of said preventing means on the occurrence of a fault on the circuit, and means for restoring the preventive action of said preventing means if the fault is outside of said circuit section including an oscillation transmitter at the other end of said section having a master oscillator electric discharge valve provided with a control electrode means, a receiver at said one end tuned to the frequency of said transmitter, means at said other end for normally applying to the control electrode means of said valve a potential such as to prevent the operation of the transmitter including fault-responsive means connected to be energized from the power circuit operative on the occurrence of a fault on the circuit to remove said potential whereby to permit said transmitter to transmit to said receiver, and supplemental means for preventing transmission of energy to said receiver when energy flow at said other end is into said circuit section.

7. In a protective arrangement for an electric power circuit including circuit interrupting means at one end of a section of the power circuit, a control circuit for effecting the opening of said circuit interrupting means, means for effecting the energization of said control circuit comprising a fault-responsive relay connected to be energized from the power circuit, means biased under normal conditions of the power circuit to prevent the energization of said control circuit, means for removing said bias on the occurrence of a fault on the power circuit, and means for restoring said bias if the fault is outside of said circuit section including an oscillation transmitter at the other end of said circuit section having an electric discharge valve with a control electrode and an anode whose potential is continuously positive, a receiver at said one end tuned to the frequency of said transmitter, fault-responsive means at said other end connected to be energized from the power circuit for normally applying a blocking potential to the control electrode of said valve whereby normally to prevent the operation of said transmitter operative on the occurrence of a fault on the circuit to remove said blocking potential whereby to permit said transmitter to transmit to said receiver, and supplemental means for preventing transmission of energy to said receiver when energy flow at said other end is into said circuit section.

8. In a protective system for a section of an electric power transmission line, line interrupting means having electrically actuated tripping means for tripping said interrupting means to disconnect the section from the line in accordance with the condition of the energization of said tripping means, an energizing source for actuating said tripping means, line-energized fault-responsive relay means actuated to control the energization of said tripping means from said energizing source in accordance with predetermined line conditions irrespective of the direction of the power flow, a second energizing source for actuating said tripping means, and line-energized relay means actuated to control the energization of said tripping means from said second energizing source in accordance with the direction of the flow of power in said line, said fault-responsive relay means cooperating with said directional relay means to selectively effect tripping of said interrupting means upon occurrence of a fault in said section and to prevent tripping of said interrupting means upon occurrence of a fault outside said section.

9. In a protective arrangement for an electric power circuit including circuit interrupting means at one end of a section of the circuit, means for effecting the opening of said circuit interrupting means comprising fault responsive interrupting means connected to be energized from the circuit, means for preventing the opening of the circuit interrupting means under predetermined circuit conditions, means for eliminating the preventive action of said preventing means on the occurrence of a fault on the circuit, and means for restoring the preventive action of said preventing means if the fault is outside said circuit section including an oscillation transmitter at the other end of said circuit section, a receiver at said one end tuned to the frequency of said transmitter, and means at said other end connected to be energized by the circuit operative on the occurrence of a fault in accordance with the direction of the energy flow to prevent the operation of said transmitter and to cause the operation of said transmitter on the occurrence of a fault when the energy at the other section end flows out of said circuit section.

10. In a protective arrangement for an electric power circuit including circuit interrupting means at one end of a section of the power circuit, a control circuit for effecting the opening cuit of said circuit interrupting means, means for effecting the energization of said control circuit comprising a fault responsive relay connected to be energized from the power circuit, means restrained under normal conditions of the power circuit to prevent the energization of said control circuit, means for removing said restrain on the occurrence of a fault on the power circuit, and means for restoring said restrain if the fault is outside said circuit section including an oscillation transmitter at the other end of said circuit section, a receiver at said one end tuned to the frequency of said transmitter, and means at said other end connected to be energized by the circuit operative on the occurrence of a fault in accordance with the direction of the energy flow to prevent the operation of said transmitter and to cause the operation of said transmitter on the occurrence of a fault when the energy flow at the other section end flows out of said circuit section.

11. In a protective arrangement for an electric power circuit including circuit interrupting means at one end of a section of the circuit, means for effecting the opening of said circuit interrupting means comprising fault responsive means connected to be energized from the circuit, means for preventing the opening of the circuit interrupting means under predetermined circuit conditions, means for eliminating the preventive action of said preventing means on the occurrence of a fault on the circuit, and normally ineffective restoring means including circuit energized means at the other section end operative on the occurrence of a fault in accordance with the direction of the energy flow in the circuit for restoring the preventive action of said preventing means on the occurrence of a fault if the fault is outside said circuit section.

12. In a protective system for a section of a high voltage electric power transmission line, line interrupting means including electrically actuated tripping means for tripping said interrupting means to disconnect the section from the line in accordance with the condition of the energization of said tripping means, an energizing circuit for energizing said tripping means, line-energized fast-acting fault responsive relay means having a set of contacts included in said energizing circuit actuated to control the condition of the energization of said circuit in accordance with predetermined conditions of said line irrespective of the direction of the power line, line-energized directional relay means having a set of contacts actuated in accordance with the direction of the flow of power in said line, and control means having an independent energizing circuit for supplying energy to said tripping means comprising a circuit portion including the contacts of said directional relay means, said fault responsive relay means cooperating with said directional relay means to selectively effect tripping of said interrupting means upon occurrence of a fault in said section and to prevent tripping of interrupting means upon occurrence of a fault outside said section.

13. In a protective relaying equipment for effecting a control of line sectionalizing circuit interrupter means at one end of a transmission line section, normally ineffective transmitter means at the other end of the line section for transmitting a signal current from its end to the first mentioned end of the line section, means at said other end responsive to faults accompanied by current flow direction out of the protected line section at that end for causing the effective operation of said transmitter means during a time when the circuit interrupter operation should be blocked, normally inactive circuit interrupter operating means at the first mentioned end including a receiver relay having a tripping position and a normal non-tripping position, normally ineffective trip position means tending, when effectively operative, to cause said receiver relay to move to its tripping position, means responsive to an effective received signal current for blocking the movement of said receiver relay to its tripping position, and means responsive in a predetermined manner to faults on the transmission line for rendering said trip position means effective in the absence of said blocking action.

14. In a protective system for a section of a high voltage electric power transmission line including line interrupting means having electrically actuated trip means for opening said interrupting means to disconnect the section from the line in accordance with the condition of the actuation of said trip means, an actuating circuit for actuating said trip means, line energized fault responsive relay means actuated to control the actuation of said trip means through said actuating circuit in accordance with predetermined line conditions irrespective of the direction of the power flow, a second actuating circuit for actuating said trip means, and line energized relay means actuated to control the actuation of said trip means through said second actuating circuit in accordance with the direction of the flow of energy in said line, said fault responsive relay means cooperating with said directional relay means to selectively effect opening of said interrupting means upon occurrence of a fault in said section and to prevent opening of said interrupting means upon occurrence of a fault outside said section.

15. In a protective arrangement for a section of an electric circuit having interrupter means at one section end for disconnecting the section from the circuit, opening means for effecting the opening of said interrupter means comprising fault responsive means connected to be energized from the circuit, means for preventing the opening of the interrupter means under normal operating conditions, normally ineffective prevention eliminating means for eliminating the preventive action of said preventing means upon occurrence of a fault, and normally ineffective restoring means including circuit energized means at the other section end operative on the occurrence of a fault in accordance with the direction of the energy flow for restoring the preventive action of said preventing means if the energy at the other section end flows out of said section, said opening means being actuated on the occurrence of a fault to effect the opening of said interrupter means in the absence of the restoring action of said restoring means.

16. In a protective arrangement for a section of an electric power transmission line having interrupter means at one section end for disconnecting the section from the line, opening means for effecting the opening of said interrupter means including blocking means for blocking the opening of the interrupter means by said opening means under normal line operating conditions, normally inactive blocking eliminating means including line energized means for eliminating the blocking action of said blocking means upon occurrence of a fault on the line, and normally inactive restoring means including line energized means at the other section end operative on the occurrence of a fault on the line in accordance with the direction of the energy flow in the line for restoring the blocking action of said blocking means if the energy at the other section end flows out of said line section, said opening means being actuated on the occurrence of a fault to effect the opening of said interrupter means in the absence of the restoring action of said restoring means.

17. In a protective arrangement for a section of an electric power transmission line having interrupter means at one section end for disconnecting the section from the line, opening means for effecting the opening of said interrupter means comprising line energized fault responsive means, blocking means for blocking the opening of the interrupter means by said opening means under normal line operating conditions, normally ineffective means for eliminating the blocking action of said blocking means upon occurrence of a fault on the line, and normally ineffective means including line energized means at the other section end operative on the occurrence of a fault on the line in accordance with the direction of the energy flow in the line for preventing the elimination of the blocking action of said blocking means if the energy at the other section end flows out of said section end, said opening means being actuated on the occurrence of a fault to effect the opening of said interrupter means in the absence of the blocking action of said blocking means.

18. In a protective system for a section of an electric power transmission line having interrupter means at one section end for disconnecting the section from the line, electrically actuated opening means for effecting the opening of said interrupter means in accordance with the actuation of said opening means, an actuating circuit for actuating said opening means, line energized fault responsive means actuated to control the actuation of said opening means through said actuating circuit in accordance with predetermined line conditions and operative on the occurrence of a fault on the section to effect opening of said interrupter means irrespective of the direction of the energy flow in the line, a second actuating circuit for actuating said opening means, and means including line actuated directional means at the other section end for controlling the actuation of said opening means through said second actuating circuit in accordance with the direction of the flow of energy in said line, said fault responsive means cooperating with said directional means to effect opening of said interrupting means upon occurrence of a fault in said section and to prevent opening of said interrupting means upon occurrence of a fault outside said section.

19. In a protective arrangement for a section of an electric power transmission line having interrupter means at each section end for disconnecting the section from the line and opening means for opening said interrupter means upon the occurrence of a fault on the section, relaying means at each section end for actuating said opening means comprising opening preventing means for actuating said opening means to prevent opening of said interrupter means under predetermined line conditions and operative on the occurrence of a fault requiring disconnection of the section from the line to eliminate the preventive action of said preventing means, and restoring means including means at the other section end operative on the occurrence of a fault in accordance with the direction of the energy flow in the line for restoring the preventive action of the preventive means at both section ends if the energy at the other section end flows out of said section, said opening means being actuated upon the occurrence of a fault to effect opening of said interrupter means in the absence of said restoring action.

20. A line protective arrangement as defined by claim 19 characterized by said restoring means including a carrier energy transmitter and a carrier energy receiver at each section end.

21. A line protective arrangement as defined by claim 19 characterized by said preventing means having normally closed contacts actuated to open for eliminating the preventing action.

22. A line protective arrangement as defined by claim 19 characterized by said restoring means having normally closed contacts actuated to open for restoring the opening preventing action.

23. A line protective arrangement as defined by claim 19 characterized by said preventing means having normally closed contacts actuated to open for eliminating the preventing action, and by said restoring means having normally closed contacts actuated to open for restoring the opening preventing action.

24. A protective system as defined by claim 18 characterized by said means which control the actuation of the opening means through the second actuating circuit having a carrier receiver at the one section end and a carrier transmitter at the other section end selectively controlled by the directional means.

25. In a protective system for a section of an alternating current transmission line including line interrupting means for disconnecting the section from the line, electrically actuated tripping means operative to leave said interrupting means closed while said tripping means are energized and to cause opening of said interrupting means upon de-energization of said tripping means, line-energized fast-acting fault resposive relay means having a set of normally closed contacts actuated to open upon a predetermined drop of the voltage on the line irrespective of the direction of the power flow, an energizing circuit for said tripping means including said normally closed contacts of said fault responsive relay means, line-energized fast-acting directional relay means having a set of circuit controlling contacts actuated to open in accordance with the direction of energy flow in the line, and control means having a circuit element including said contacts of said directional relay means for independently supplying actuating energy to said tripping means to cause selective opening of the interrupting means in accordance with location of a fault within or outside of said section.

26. In a protective system for a section of an alternating current transmission line having at each section end line interrupting means for disconnecting the section from the line, electrically actuated tripping means operative to leave said interrupting means closed while said tripping means are energized and to cause opening of said interrupting means upon de-energization of said tripping means, line-energized fast-acting fault responsive relay means having a set of normally closed contacts actuated to open upon a predetermined drop of the voltage on the line irrespective of the direction of the power flow, an energizing circuit for said tripping means including said normally closed contacts of said fault responsive relay means, line-energized fast-acting directional relay means having a set of normally closed contacts actuated to open in accordance with the direction of energy flow in the line, and control means having a circuit element including said normally closed contacts of said directional relay means for independently supplying actuating energy to said tripping means to cause selective opening of the interrupting means only upon occurrence of a fault inside of said section.

27. In a protective system for a section of an alternating current transmission line including line interrupting means for disconnecting the section from the line, electrically actuated tripping means operative to leave said interrupting means closed while energized and to cause opening of said interrupting means upon de-energization of said tripping means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of contacts actuated in accordance with the direction of energy flow in the line, and control means comprising a carrier transmitter having an energizing circuit including said contacts of said directional relay means for independently supplying actuating energy from said transmitter to said tripping means to cause selective opening of the interrupting means in accordance with location of a fault within or outside of said section.

28. In a protective system for a section of an alternating current transmission line having at each section end line interrupting means for disconnecting the section from the line, electrically actuated tripping means operative to leave said interrupting means closed while energized and to cause opening of said interrupting means upon de-energization of said tripping means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of contacts actuated in accordance with the direction of energy flow in the line, and control means comprising a carrier transmitter having an energizing circuit including said contacts of said directional relay means for independently supplying actuating energy from said transmitter to said tripping means to cause opening of the interrupting means only upon occurrence of a fault within said section.

29. In a protective system for a section of an alternating current transmission line including line interrupting means for disconnecting the section from the line, tripping means having an electrically actuated tripping circuit for opening the interrupting means upon completion of said circuit, tripping relay means having circuit contacts included in said tripping circuit operative to stay open while said relay means is energized and to close upon de-energization of said relay means for opening said interrupting means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of contacts actuated in accordance with the direction of energy flow in the line, and control means comprising a carrier transmitter having an energizing circuit including said contacts of said directional relay means for independently supplying actuating energy from said transmitter to said tripping relay means to cause selective opening of the interrupting means in accordance with location of a fault within or outside of said section.

30. In a protective system for a section of an alternating current transmission line having at each section end line interrupting means for disconnecting the section from the line, tripping means having an electrically actuated tripping circuit for opening the interrupting means upon completion of said circuit, tripping relay means having circuit contacts included in said tripping circuit operative to stay open while said relay means is energized and to close upon de-energization of said relay means for opening said interrupting means, line-energized fast-acting fault responsive relay means having a set of normally closed contacts actuated to open upon occurrence of a fault on the line irrespective of the direction of the power flow, an energizing circuit for said tripping means including said normally closed contacts of said fault responsive relay means, line-energized fast-acting directional relay means having a set of normally closed contacts actuated to open in accordance with the direction of energy flow in the line, and control means comprising a carrier transmitter having an energizing circuit including said normally closed contacts of said directional relay means for independently supplying actuating energy from said transmitter to said tripping relay means to cause opening of the interrupting means only upon occurrence of a fault within said section.

PHILIP SPORN.
CHARLES ALBERT MULLER.